(12) United States Patent
Chang et al.

(10) Patent No.: US 8,959,972 B2
(45) Date of Patent: Feb. 24, 2015

(54) TOP CAP OF BICYCLE HANDLEBAR STEM TUBE AND METHOD FOR MANUFACTURING SAME

(75) Inventors: Shih-Chieh Chang, Fengyuan (TW); Ting-Chi Chang, Fengyuan (TW)

(73) Assignees: Pepoman Co., Ltd., Taichung County (TW); Shih-Chieh Chang, Taichung County (TW)

( * ) Notice: Subject to any disclaimer, the term of this patent is extended or adjusted under 35 U.S.C. 154(b) by 737 days.

(21) Appl. No.: 12/906,138

(22) Filed: Oct. 18, 2010

(65) Prior Publication Data

US 2011/0091300 A1 Apr. 21, 2011

(30) Foreign Application Priority Data

Oct. 20, 2009 (TW) ............................... 98135455 A

(51) Int. Cl.
| | |
|---|---|
| B21D 22/00 | (2006.01) |
| B21C 23/18 | (2006.01) |
| B21J 13/00 | (2006.01) |
| B62K 21/12 | (2006.01) |
| B21K 1/76 | (2006.01) |
| B21K 23/04 | (2006.01) |
| F16B 37/04 | (2006.01) |
| F16B 43/00 | (2006.01) |
| F16B 7/18 | (2006.01) |

(52) U.S. Cl.
CPC . *B62K 21/12* (2013.01); *B21K 1/76* (2013.01); *B21K 23/04* (2013.01); *F16B 37/047* (2013.01); *F16B 43/009* (2013.01); *F16B 7/18* (2013.01)
USPC .............................. 72/352; 72/267; 72/355.4

(58) Field of Classification Search
CPC ...... B21C 23/18; B21C 23/183; B21K 17/00; B21K 1/14
USPC ................ 72/352, 356, 377, 267, 254, 353.2, 72/355.2, 355.4, 355.6, 358
See application file for complete search history.

(56) References Cited

U.S. PATENT DOCUMENTS

| | | | | |
|---|---|---|---|---|
| 3,114,921 | A * | 12/1963 | Carusi | 470/30 |
| 4,291,568 | A * | 9/1981 | Stifano, Jr. | 72/356 |
| 5,146,668 | A * | 9/1992 | Gulistan | 72/356 |
| 5,582,057 | A * | 12/1996 | Litscher | 72/377 |
| 2009/0282952 | A1* | 11/2009 | Yen | 72/352 |

\* cited by examiner

*Primary Examiner* — Edward Tolan
*Assistant Examiner* — Mohammad I Yusuf
(74) *Attorney, Agent, or Firm* — Leong C. Lei

(57) ABSTRACT

A top cap is provided for a bicycle handlebar stem. The top cap includes a cap body, which has a lower portion forming a fitting cylinder of a reduced diameter and a radially expanding circumferential shoulder atop the fitting cylinder. A barrel extends from a bottom of the fitting cylinder. The barrel forms a downward-facing hollow blind hole. The cap body forms a bolt head hole extending therethrough and coaxial with and communicating the blind hole. The barrel forms slits, which define a tightening section.

4 Claims, 11 Drawing Sheets

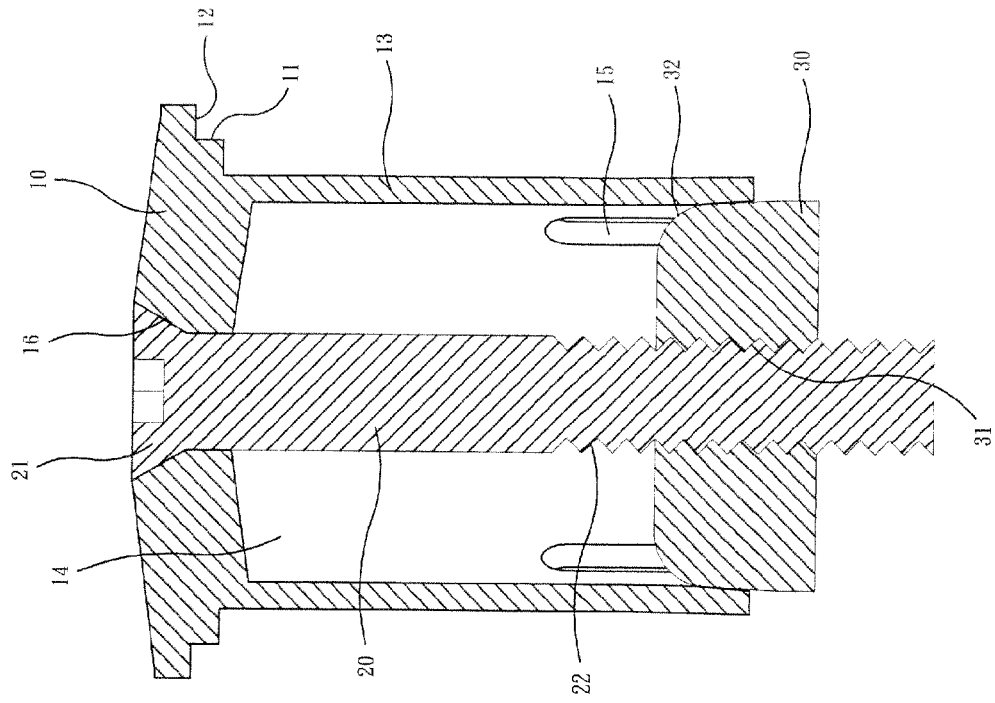
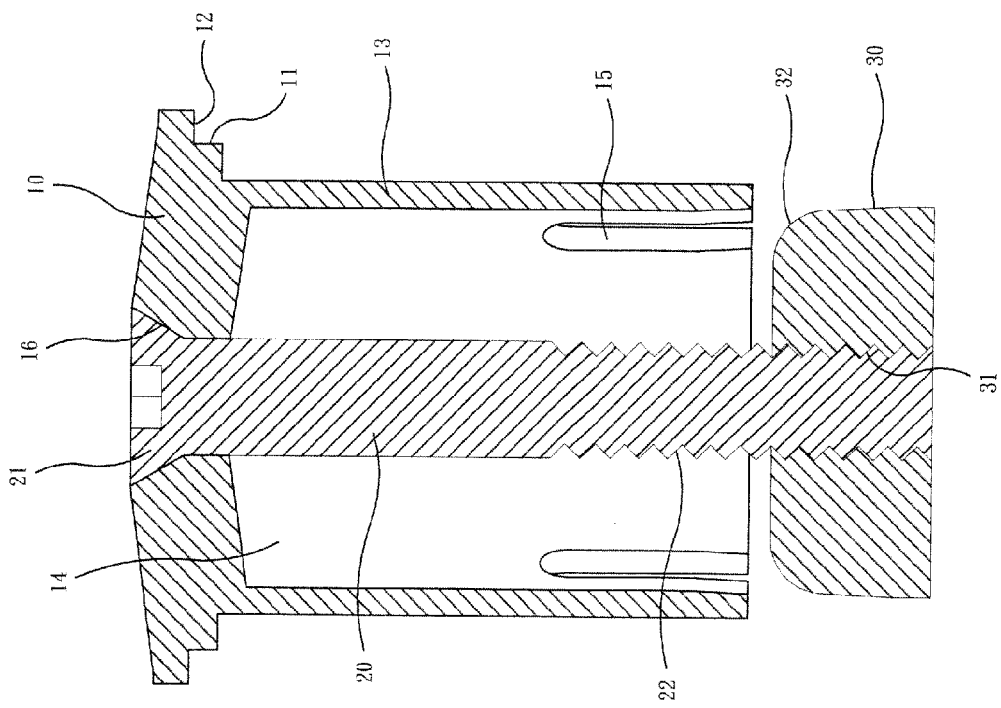
FIG.4A
FIG.4B

TOP CAP OF BICYCLE HANDLEBAR STEM TUBE AND METHOD FOR MANUFACTURING SAME

(a) TECHNICAL FIELD OF THE INVENTION

The present invention generally relates to a top cap for a bicycle handlebar stem, which meets the needs for high precision, reduces manufacturing cost, and improves mounting strength.

(b) DESCRIPTION OF THE PRIOR ART

A handlebar stem of a bicycle has a mounting hole, which is often mounted to a head tube of a front fork through a top cap. As shown in FIG. 1, a conventional handlebar stem top cap (91) is used with a fastening element (93). The handlebar stem top cap (91) comprises a fitting cylinder (91a) that mates an upper edge of the handlebar stem mounting hole, a circumferential shoulder (91b) that is positioned on top of the handlebar stem, and a bolt head hole (91c) that extends vertically through the top cap. The fastening element (93) is received in the head tube of the bicycle front fork and comprises a nut (93a) having an outer circumferential surface to which fastening plates (93b) are attached at upper and lower portions thereof through welding. The fastening plates (93b) are in the form of a conic shape that shows flaring divergence in extending upward and has an outer circumference in which a plurality of spaced fan-shaped notches (93c), to allow the fastening plates (93b) to resiliently and tightly engage an inside surface of the head tube of the front fork. A bolt (92) is then put through the bolt head hole (91c) to engage the nut (93a). When the bolt (92) is rotated in a tightening direction, the circumferential shoulder (91b) is caused to depress the top of the handlebar stem, whereby the handlebar stem is securely mounted to the head tube of the bicycle front fork through the top cap. This arrangement allows a user to operate the handlebar stem for rotating the head tube of the front fork thereby controlling moving direction of the bicycle.

The conventional way is to employ a machine tool, such as a lathe, to machine the handlebar stem top cap (91) for forming the fitting cylinder (91a), the circumferential shoulder (91b), and the bolt head hole (91c). The fastening element (93) is made by first forming the fastening plates (93b) and the fan-shaped notches (93c) separately, and then welding can be applied to fix the fastening plates (93b) to the outer circumferential surface of the nut (93a). Such an arrangement of separate handlebar stem top cap (91) and fastening element (93) suffers some drawbacks:

(1) Different tools and equipments must be used to separately make the handlebar stem top cap (91) and the fastening element (93). This makes it impossible to employ single-process automatic manufacturing, so that the overall manufacturing efficiency cannot be improved, eventually making the manufacturing cost high.

(2) Wastes or chips are generated in the process of lathing or otherwise machining the handlebar stem top cap (91) and stamping the fan-shaped notches (93c). This causes a significant waste of material.

(3) It is not possible to strengthen or improve material density and strength of the handlebar stem top cap (91) and the fastening element (93).

(4) The fastening element (93) is received in and set in tight resilient engagement with the head tube of the bicycle front fork, whereby there is a potential risk of elastic fatigue of the fastening plates (93b), leading loss of mounting force of the fastening element with respect to the head tube of the front fork.

In view of the above discussed problem associated with separate handlebar stem top cap (91) and fastening element (93) in respect of being impossible to reduce manufacturing costs and improve product quality, the present invention aims to provide a novel top cap for bicycle handlebar stem that helps overcoming the problems.

SUMMARY OF THE INVENTION

An objective of the present invention is to provide a top cap for a bicycle handlebar stem. The top cap comprises a cap body, which has a lower portion forming a fitting cylinder of a reduced diameter and a radially expanding circumferential shoulder atop the fitting cylinder. A barrel extends from a bottom of the fitting cylinder. The barrel forms, in a coaxial manner, a downward-facing hollow blind hole. The cap body forms a bolt head hole extending therethrough and coaxial with and communicating the blind hole. The barrel forms slits in a lower edge thereof, so that the slits define a tightening section for receiving a nut to be fit therein. Thus, when a bolt fit through the bolt head hole and engaging the nut, through rotation of the bolt, displacement of the nut in the blind hole is controlled to expand the barrel, making the barrel securely fixed inside a head tube of a front fork of the bicycle to improve the coupling strength between the handlebar stem top cap and the head tube of the front fork.

Another objective of the present invention is to provide a method for manufacturing a top cap for a bicycle handlebar stem, comprising the following steps: (A) providing a metal bar of predetermined shape and weight; (B) forming a blind hole in a bottom of the bar with cold forging; (C) stepwisely shaping the blind hole for desired diameter and depth with progressive repeated cold forging so as to form a downward facing hollow barrel under a cap body and also forming a tightening section on the barrel through progressive cold forging; (D) final shaping of the blind hole and the tightening section, forming a recessed auxiliary hole of reduced diameter, and forming a fitting cylinder and a circumferential shoulder on an outer circumference of the cap body; (E) forming a bolt head hole that covers the auxiliary hole in a top of the cap body with cold forging in such a way to coaxially penetrate and communicate the blind hole. As such, automatic continuous single-process manufacturing with cold forging can be realized for making a top cap with a barrel, wherein the overall precision, mechanical property, and coupling strength are all excellent, and an advantage of reducing manufacturing cost can be achieved. The prevent invention is thus a novel technical solution for manufacturing of top caps for bicycle handlebar stems.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIGS. 4A and 4B demonstrate a tightening process of the handlebar stem top cap shown in FIG. 3.

DETAILED DESCRIPTION OF THE PREFERRED EMBODIMENTS

Figure 1:
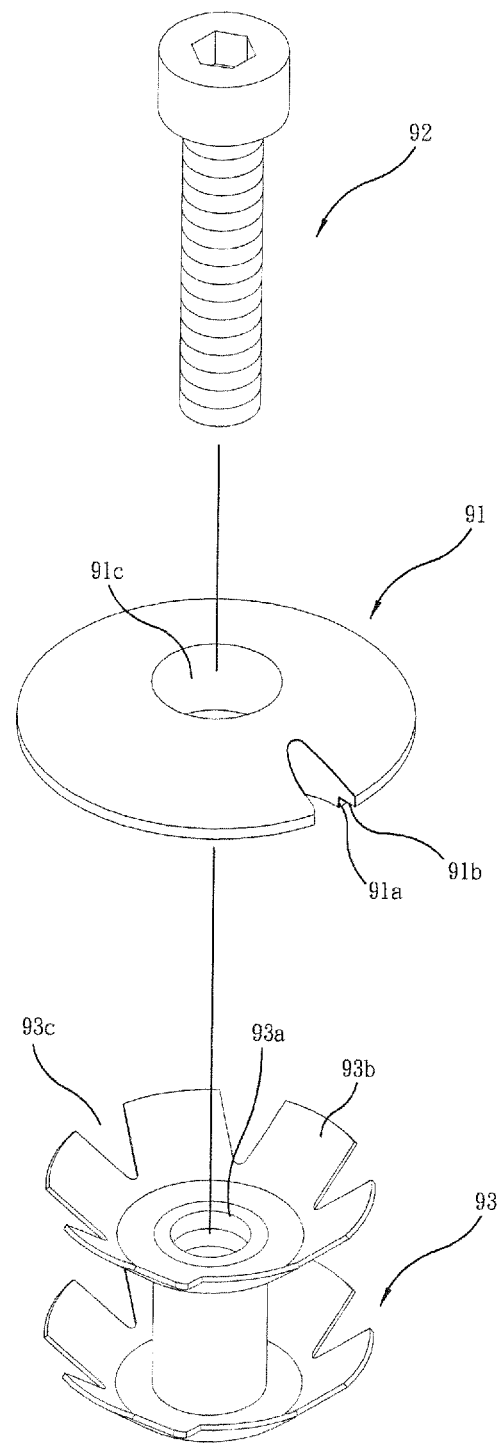
FIG. 1 is schematic view illustrating a conventional top cap for a bicycle handlebar stem.
Figure 2:
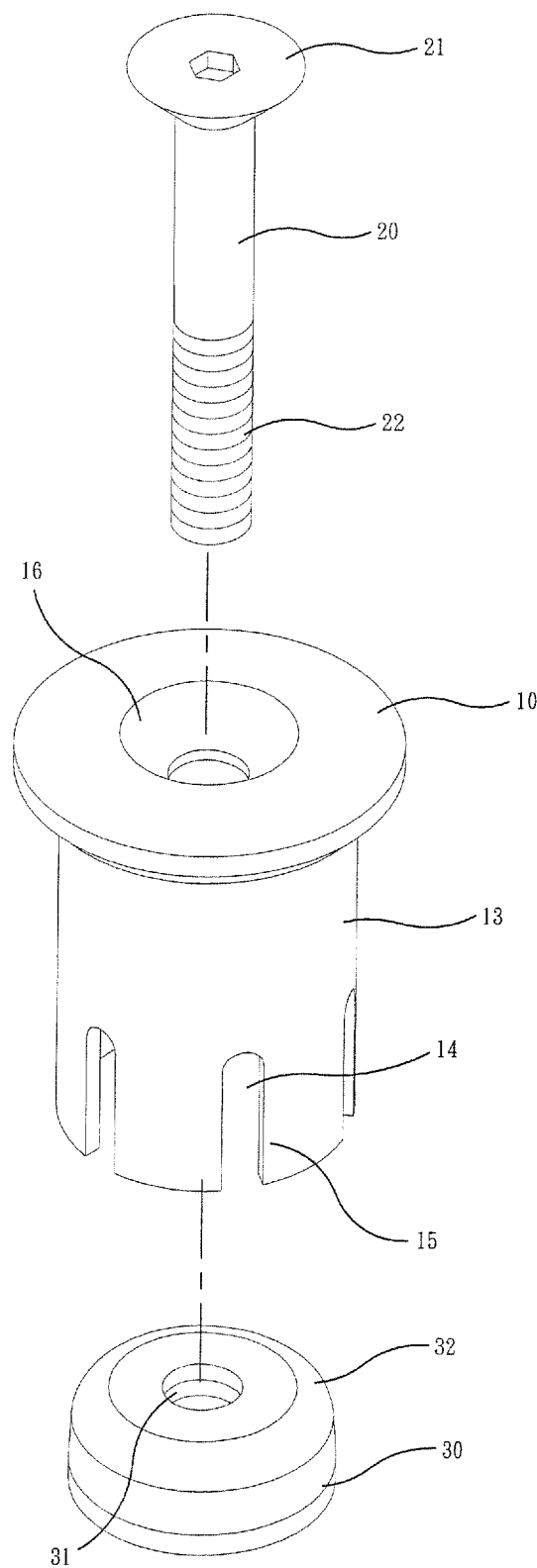
FIG. 2 is an exploded view showing a top cap for bicycle handlebar stem, a bolt, and a nut according to the present invention.
Figure 3:
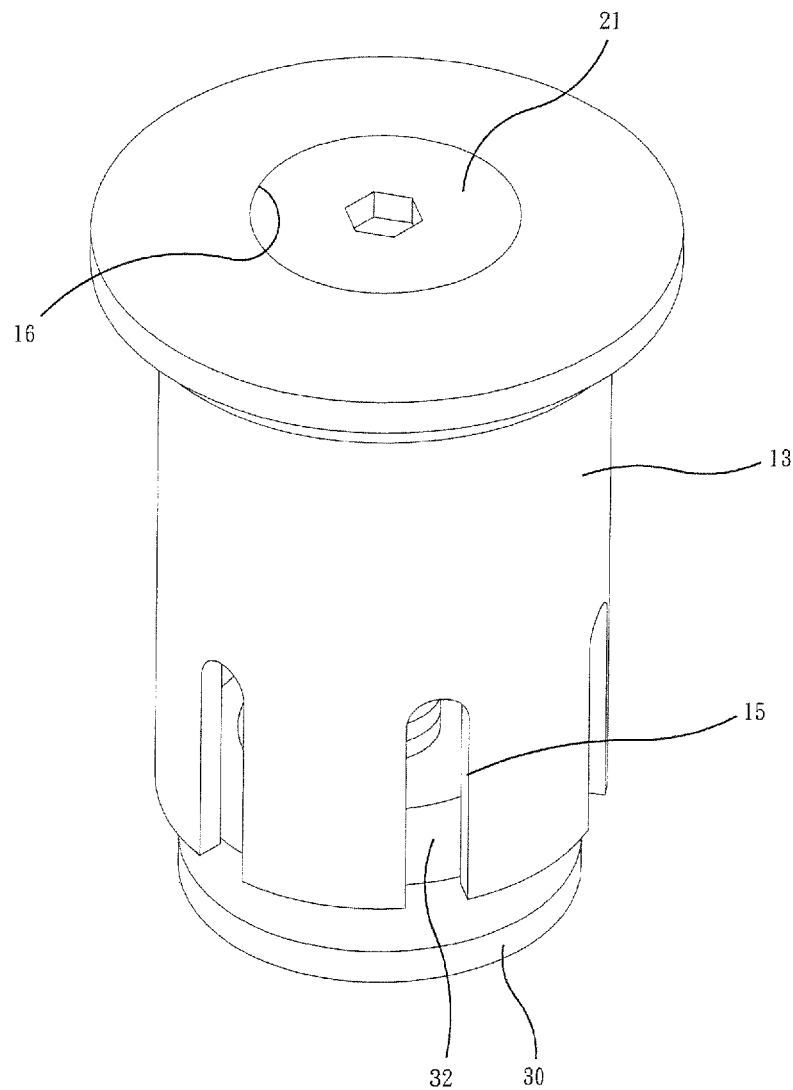
FIG. 3 is a perspective view showing the handlebar stem top cap, the bolt, and the nut according to the present invention in an assembled form.
Figure 5:
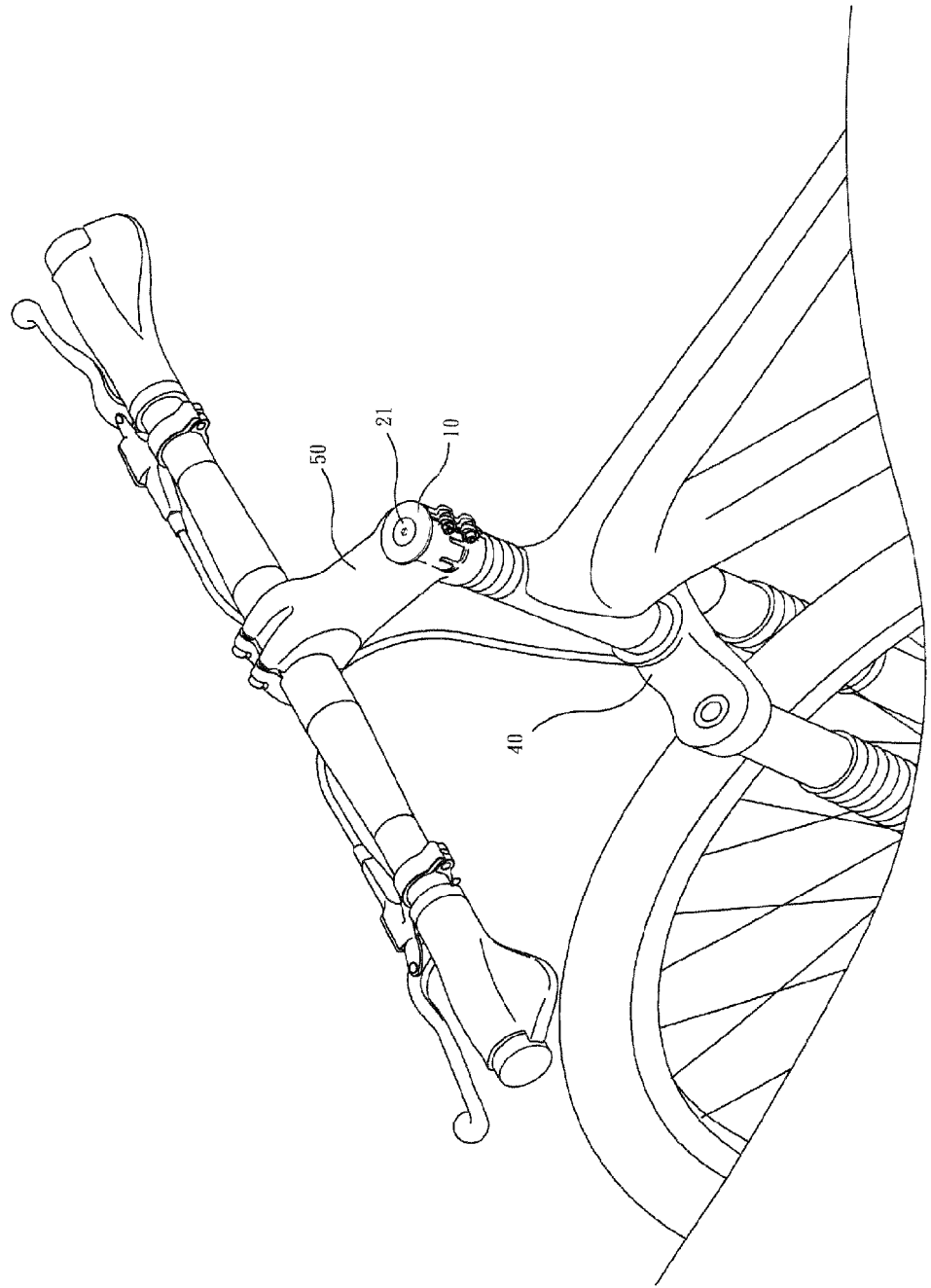
FIG. 5 is a schematic view illustrating an application of the present invention to a bicycle.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 2-5, the present invention provides a top cap for a bicycle handlebar stem. The top cap comprises the following components.

A cap body (10) has a lower portion forming a fitting cylinder (11) of a reduced diameter and a radially expanding circumferential shoulder (12) atop the fitting cylinder (11). The cap body (10) also forms a bolt head hole (16) extending through a central portion of the cap body in a vertical direction. The fitting cylinder (11) is sized to mate a top flange of a mounting hole of a handlebar stem (50) with the circumferential shoulder (12) positioned on top of the handlebar stem (50). The bolt head hole (16) has an upper section in the form of a cone of which diameter is increased in an upward direction, whereby when a bolt (20) is fit into the bolt head hole (16), the head (21) of the bolt can be precisely centered in the bolt head hole (16).

A barrel (13) extends downward from a bottom of the fitting cylinder (11) in a coaxial manner to be fit into a head tube of a bicycle front fork (40). The barrel (13) forms a blind hole (14) that faces downward and has an inside diameter greater than the bolt head hole (16). A lower end portion of the barrel (13) comprises a plurality of slits defined therein in a vertical direction, the slits realize communication between inside and outside of the blind hole (14), whereby the lower end of the blind hole (14) forms a tightening section (15) for receiving a nut (30) to be fit therein. The nut (30) has a top having an outer circumference forming a curved face, whereby with a threaded shank (22) of the bolt (20) being set in engagement with an inner-threaded hole (31) of the nut (30), through rotation of the bolt (20), a user may force the fastening surface (32) of the nut (30) to gradually expand the blind hole (14), making the outside diameter of the portion of the barrel (13) increased for thereby firmly and reliably securing to the head tube of the front fork (40).

Consequently, when the tightening section (15) is set in tight fitting in the head tube of the front fork (40), the nut (30) is located in the blind hole (14), and this helps preventing the tightening section (15) from shrinking inward due to elastic fatigue. Thus, the handlebar stem top cap according to the present invention can effectively ensure and maintain proper engagement and coupling between the tightening section (15) of the barrel (13) and the head tube of the front fork (40) in mounting the handlebar stem (50) to the head tube of the front fork (40) and thereby preventing the top cap of the present invention from losing functionality.

Figure 6:
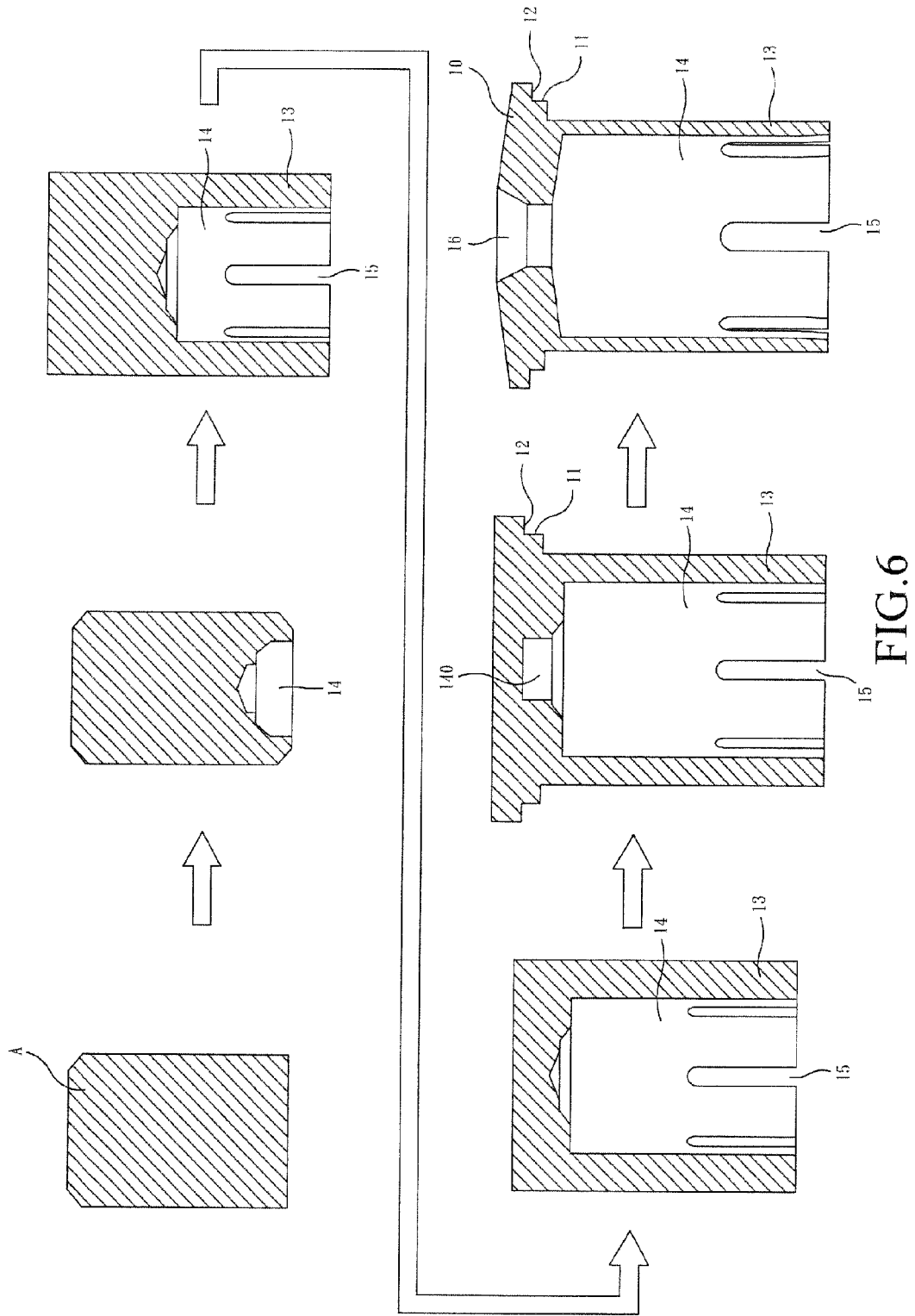
FIGS. 6 and 7 illustrate a manufacturing process of the handlebar stem the top cap according to the present invention.
Figure 7:
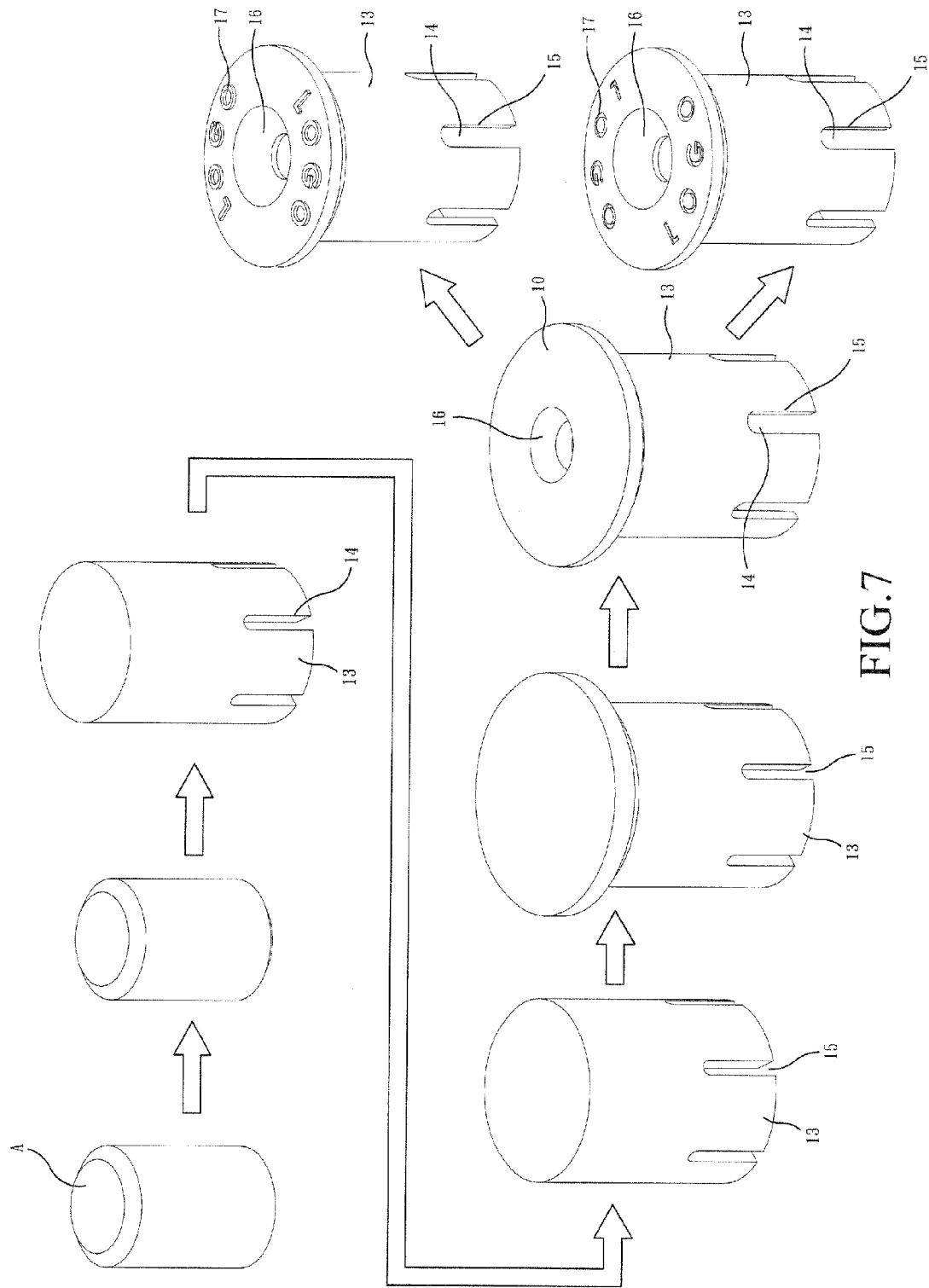
Figure 8:
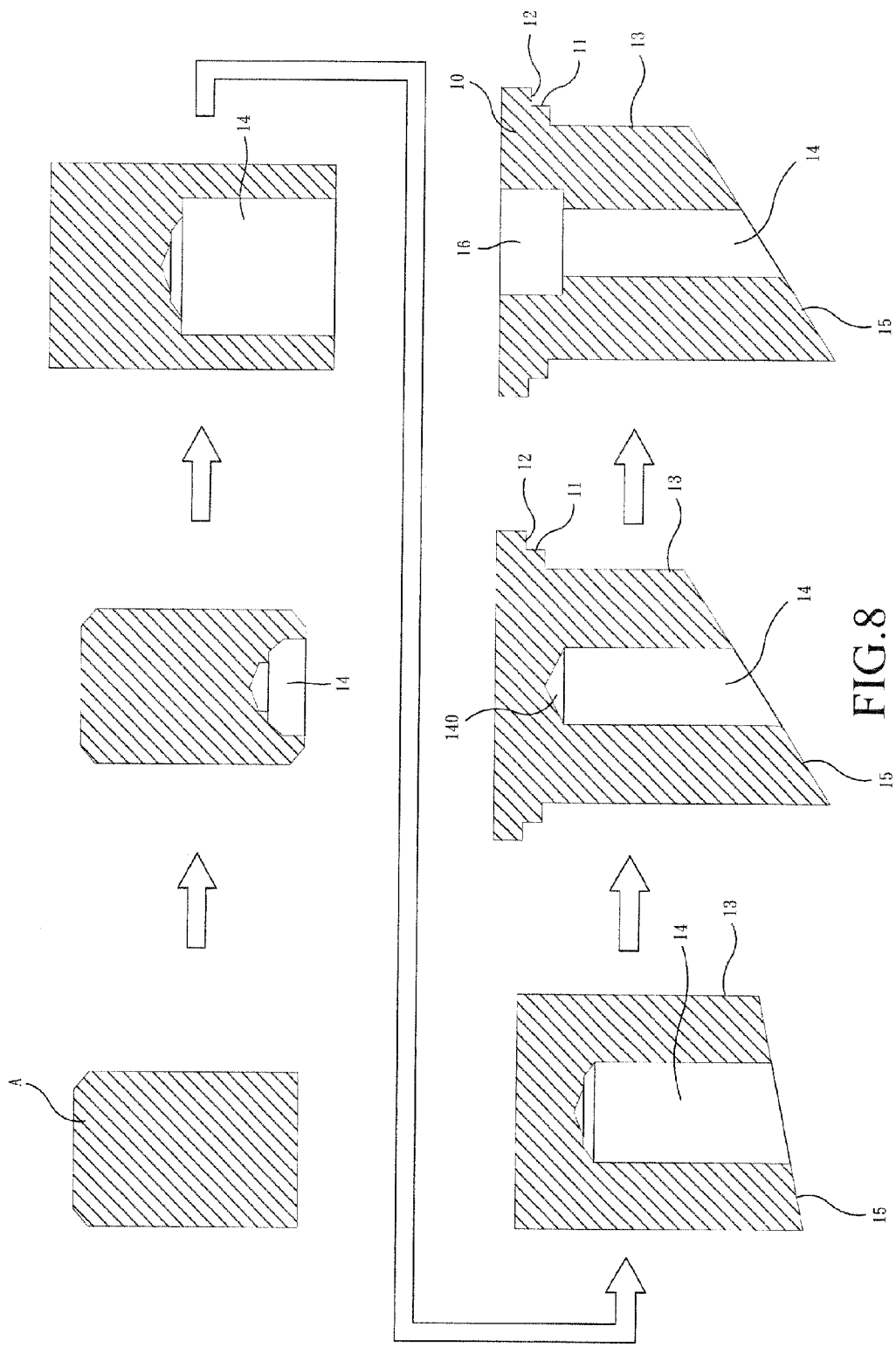
FIG. 8 illustrates a manufacturing process according to another embodiment of the present invention.
Figure 12:
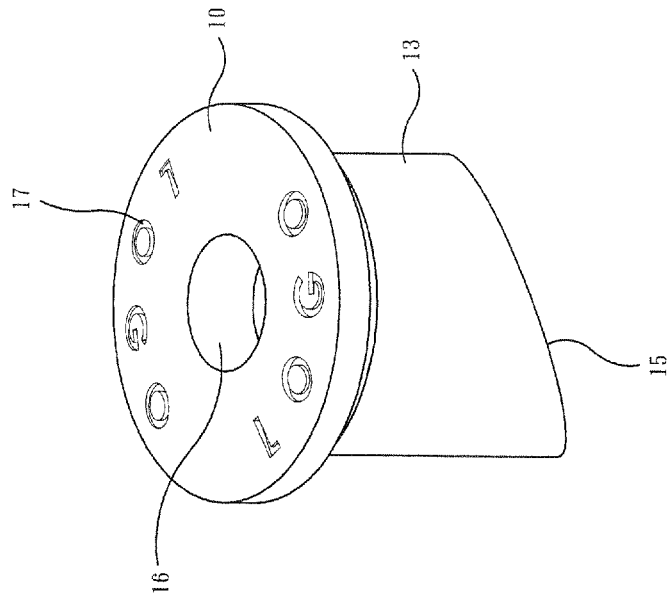
FIG. 12 is a perspective view showing an alternative form of patterns formed in the top cap of FIG. 9.
Figure 9:
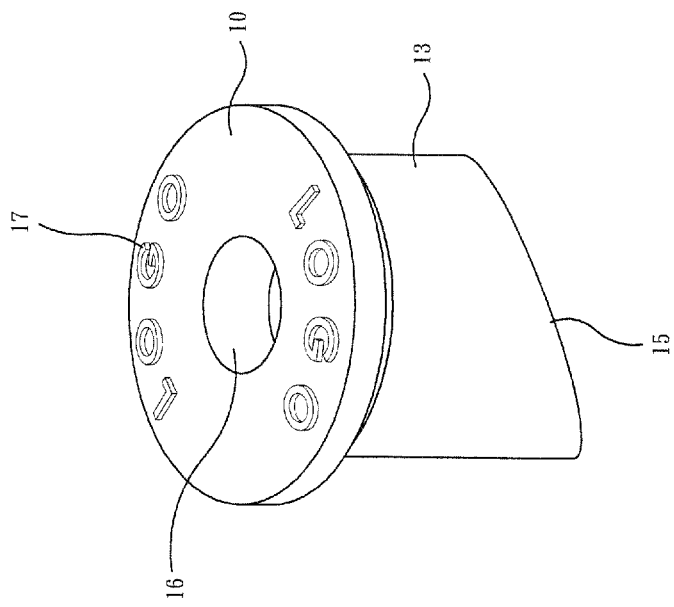
FIG. 9 is a perspective view showing a handlebar stem the top cap according to said another embodiment of the present invention.
Figure 10:
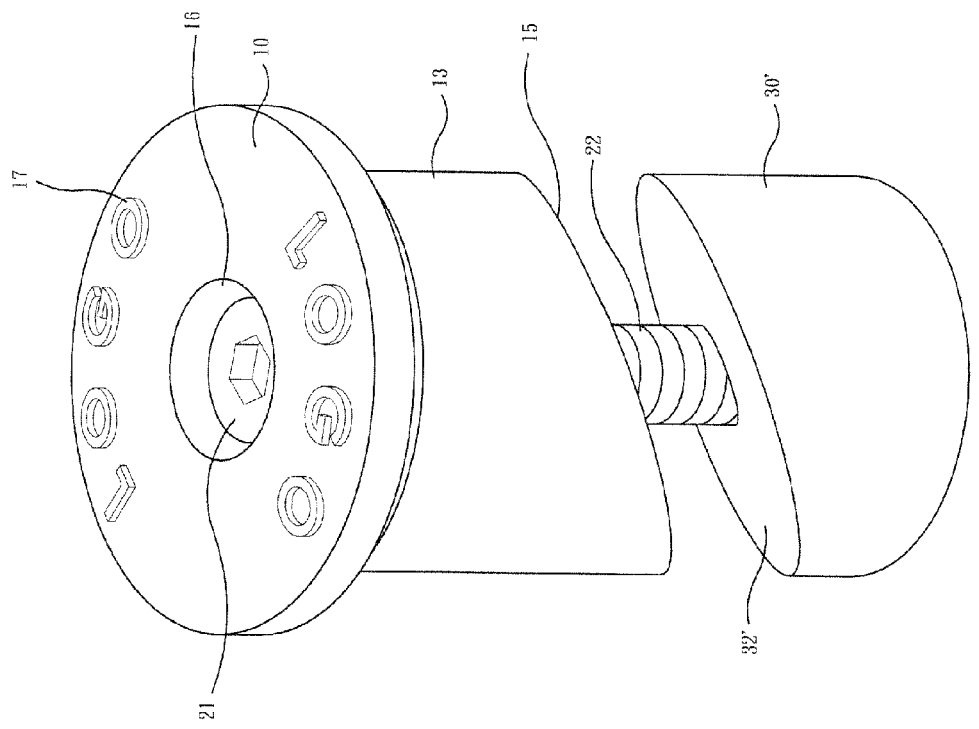
FIG. 10 is a perspective view showing the handlebar stem top cap, a bolt, and a nut according to said another embodiment of the present invention in an assembled form.
Figure 11A:
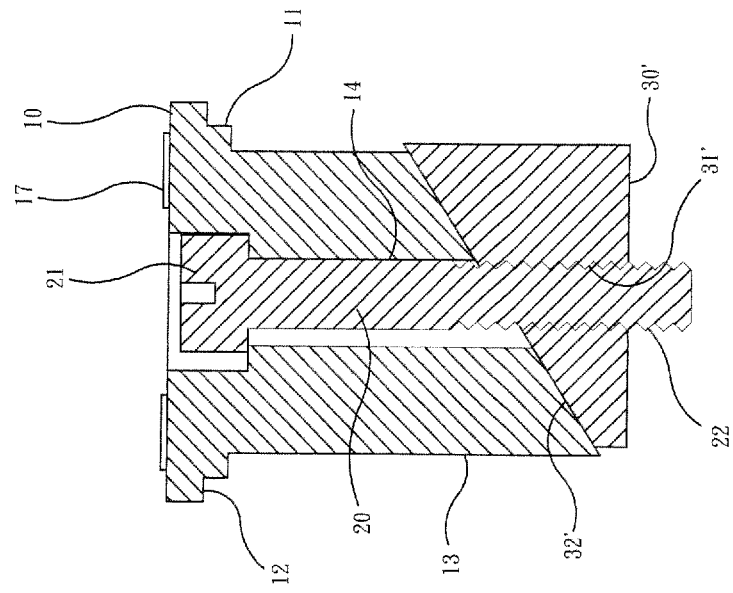
FIGS. 11A and 11B demonstrate a tightening process of the handlebar stem top cap shown in FIG. 10.
Figure 11B:
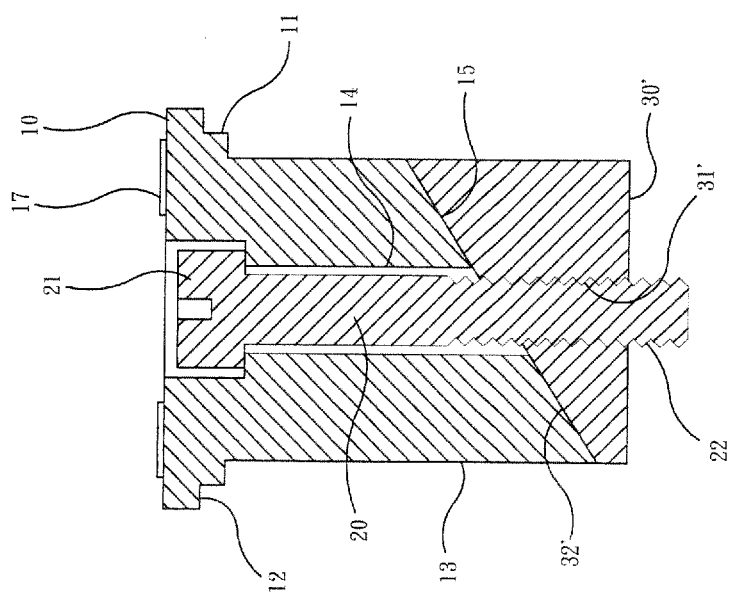

Referring to FIGS. 6 and 7, a method for manufacturing the handlebar stem top cap according to the present invention comprises the following steps:

(A) providing an extruded metal bar (A), which has a predetermined shape and weight, and a progressive die, wherein the bar (A) is made of aluminum or other alloys;

(B) setting the progressive die in a nut former or a bolt former to carry out an operation for initially forming a recess, which forms a blind hole (14), in a bottom of the metal bar (A) in such a way that the blind hole (14) does not penetrate through the bar;

(C) operating the nut former or the bolt former to perform progressive repeated cold forging with the progressive die to increase diameter and depth of the blind hole (14) to form a desired shape of the hole, for forming a downward-facing hollow barrel (13) below a cap body (10), thereby providing a primary blank of a handlebar stem the top cap, and at the same time, processing a lower edge of the barrel (13) with cold forging to form slits, which communicate in a radial direction between inside and outside of the blind hole (14) and have end openings facing downward, so as to form a tightening section (15) of the barrel (13) with the slits;

(D) operating the nut former or the bolt former to drive the progressive die for performing final shaping of the blind hole (14) and the tightening section (15), and forming a recessed auxiliary hole (140) of a reduced diameter in a center of top end of the blind hole (14), and forming a fitting cylinder (11) of a diameter greater than the barrel (13) on an outer circumferential surface of the cap body (10), and also forming a radially expanded circumferential shoulder (12) at a top end of the fitting cylinder (11); and (E) finally operating the nut former or the bolt former to drive the progressive die to form a bolt head hole (16) that has a diameter sufficient to cove the auxiliary hole (140) in the center of the top end of the cap body (10) with cold forging in such a way that the bolt head hole (16) coaxially penetrates and communicates the blind hole (14), and at the same time, forming a desired pattern (17) or logo, which is recessed or raised, on a top surface of the cap body (10) with the progressive die that comprises a pattern corresponding to the pattern (17) formed thereon to provide a desired marking effect, and thus completing the manufacturing of the handlebar stem top cap (A).

The above description shows several advantages of the present invention:

(1) The present invention employs only cold forging to complete the manufacturing and no change of tool or machine is needed in the manufacturing process, whereby automatic continuous single-process manufacturing can be realized to improve manufacturing efficiency and quality.

(2) No cutting chip is generated so that no material is wasted.

(3) Through the cold forging based manufacturing process, material density and strength of the handlebar stem top cap are improved.

Referring to FIGS. 8-11, another method for manufacturing the handlebar stem top cap according to the present invention comprises the following steps:

(A) providing an extruded metal bar (A), which has a predetermined shape and weight, and a progressive die, wherein the bar (A) is made of aluminum or other alloys;

(B) setting the progressive die in a nut former or a bolt former to carry out an operation for initially forming a recess, which forms a blind hole (14), in a bottom of the metal bar (A) in such a way that the blind hole (14) does not penetrate through the bar;

(C) operating the nut former or the bolt former to perform progressive repeated cold forging with the progressive die to increase diameter and depth of the blind hole (14) to form a desired shape of the hole, for forming a downward-facing hollow barrel (13) below a cap body (10), thereby providing a primary blank of a handlebar stem the top cap, and at the same time, processing a lower end of the barrel (13) with cold forging to form a sloped surface, which forms a tightening section (15) of the barrel (13) for mating and engaging a fastening surface (32') of a nut (30');

(D) operating the nut former or the bolt former to drive the progressive die for performing final shaping of the blind hole (14) and the tightening section (15), and forming a recessed auxiliary hole (140) of a reduced diameter in a center of top end of the blind hole (14), and forming a fitting cylinder (11) of a diameter greater than the barrel (13) on an outer circumferential surface of the cap body (10), and also forming a radially expanded circumferential shoulder (12) at a top end of the fitting cylinder (11); and (E) finally operating the nut former or the bolt former to form a bolt head hole (16) that has a diameter sufficient to cove the auxiliary hole (140) in the center of the top end of the cap body (10) with cold forging in such a way that the bolt head hole (16) coaxially penetrates and communicates the blind hole (14), and at the same time, forming a desired pattern (17) or logo, which is recessed or raised, on a top surface of the cap body (10) with the progressive die that comprises a pattern corresponding to the pattern (17) formed thereon to provide a desired marking effect, and thus completing the manufacturing of the handlebar stem top cap (A).

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A method for manufacturing a top cap of a handlebar stem, comprising the following steps:

(A) providing a metal bar, which has a predetermined shape and weight, and a progressive die that comprises a pattern formed thereon;

(B) forming a recessed blind hole in a bottom of the bar with the progressive die, the blind hole having an opening formed in the bottom of the bar and having bottom diameter;

(C) driving the progressive die to perform repeated cold forging to increase the bottom diameter and depth of the blind hole to form a cap body, wherein a downward-facing hollow barrel having a circumferential wall is formed below the cap body, and forming slits in a lower edge of the barrel with cold forging, wherein the slits extend radially through the circumferential wall and communicate in radial direction between inside and outside of the blind hole and have end openings facing downward, so as to form a tightening section of the barrel with the slits;

(D) driving the progressive die to perform final shaping of the blind hole and the tightening section in such a way that the tightening section is adapted to receive therein a nut, and forming a recessed auxiliary hole of a reduced diameter that is smaller than the bottom diameter of the blind hole in a center of a top end of the blind hole, and forming a fitting cylinder of an increased diameter on top of the barrel, and also forming a radially expanded circumferential shoulder at a top end of the fitting cylinder; and (E) driving the progressive die to form a bolt head hole that has a diameter sufficient to cover the auxiliary hole in the center of the top end of the cap body with cold forging in such a way that a pattern corresponding to the pattern of the progressive die is formed on a top surface of the top cap and the bolt head hole coaxially penetrates and communicates the blind hole, wherein the bolt head hole is adapted to receive therein a bolt that extends through the auxiliary hole and engages the nut in such a way that the tightening section is expanded by the nut without tearing the tightening section.

2. The method according to claim 1, wherein the progressive die is mounted on a nut former or a bolt former to carry out processive shaping of the metal bar.

3. A method for manufacturing a top cap of a handlebar stem, comprising the following steps:

(A) providing a metal bar, which has a predetermined shape and weight, and a progressive die that comprises a pattern formed thereon;

(B) forming a recessed blind hole in a bottom of the bar with the progressive die, the blind hole having an opening formed in the bottom of the bar and having bottom diameter;

(C) driving the progressive die to perform repeated cold forging to increase the bottom diameter and depth of the blind hole to form a cap body, wherein a downward-facing hollow barrel is formed below the cap body, and forming a sloped surface on a lower end of the barrel with cold forging so as to form a tightening section adapted to mate and engage a fastening surface of a nut;

(D) driving the progressive die to perform final shaping of the blind hole and the tightening section, and forming a recessed auxiliary hole of a reduced diameter in a center of top end of the blind hole, and forming a fitting cylinder of an increased diameter on top of the barrel, and also forming a radially expanded circumferential shoulder at a top end of the fitting cylinder; and (E) driving the progressive die to form a bolt head hole that has a diameter sufficient to cover the auxiliary hole in the center of the top end of the cap body with cold forging in such a way that a pattern corresponding to the pattern of the progressive die is formed on a top surface of the top cap and the bolt head hole coaxially penetrates and communicates the blind hole, wherein the bolt head hole is adapted to receive therein a bolt that engages an inner threaded hole of the nut.

4. The method according to claim 3, wherein the progressive die is mounted on a nut former or a bolt former to carry out processive shaping of the metal bar.

\* \* \* \* \*